(12) United States Patent
Al-Imari et al.

(10) Patent No.: US 10,999,023 B2
(45) Date of Patent: May 4, 2021

(54) METHOD AND APPARATUS FOR FREQUENCY DOMAIN RESOURCE ALLOCATION WHEN FREQUENCY HOPPING IS ENABLED IN MOBILE COMMUNICATIONS

(71) Applicant: MediaTek Singapore Pte. Ltd., Singapore (SG)

(72) Inventors: Mohammed S Aleabe Al-Imari, Cambridge (GB); Abdellatif Salah, Cambridge (GB); Abdelkader Medles, Cambridge (GB); Mikko Kyllonen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/510,962

(22) Filed: Jul. 14, 2019

(65) Prior Publication Data
US 2020/0021406 A1    Jan. 16, 2020

Related U.S. Application Data

(60) Provisional application No. 62/698,390, filed on Jul. 16, 2018.

(51) Int. Cl.
*H04L 5/00*        (2006.01)
*H04W 72/04*    (2009.01)

(52) U.S. Cl.
CPC .......... *H04L 5/0007* (2013.01); *H04L 5/0012* (2013.01); *H04L 5/0048* (2013.01);
(Continued)

(58) Field of Classification Search
CPC ... H04L 5/0039; H04L 5/0023; H04L 5/0048; H04L 5/0012; H04W 72/04; H04W 72/042; H04W 72/0453
See application file for complete search history.

(56) References Cited

U.S. PATENT DOCUMENTS 10,165,550 B2 * 12/2018 Webb ..................... H04W 72/04
2014/0098761 A1 * 4/2014 Lee ..................... H04W 72/005
                                                                                370/329
(Continued)

FOREIGN PATENT DOCUMENTS

WO    WO 2016026068 A1    2/2016

OTHER PUBLICATIONS

Taiwan Intellectual Property Office, Office Action for Taiwan Patent Application No. 108124986, dated Apr. 30, 2020.
(Continued)

*Primary Examiner* — Raj Jain
(74) *Attorney, Agent, or Firm* — Han IP PLLC; Andy M. Han

(57) ABSTRACT

Various solutions for frequency domain-resource allocation (FD-RA) when frequency hopping is enabled with respect to user equipment and network apparatus in mobile communications are described. An apparatus may determine whether frequency hopping is enabled. The apparatus may determine at least one of a first coarse step size corresponding to a start of an FD-RA and a second coarse step size corresponding to a length of the FD-RA in an event that the frequency hopping is enabled. The apparatus may determine allocated resources blocks (RBs) according to at least one of the first coarse step size and the second coarse step size. The apparatus may perform a transmission on the allocated RBs.

18 Claims, 4 Drawing Sheets

(52) U.S. Cl.
CPC ....... *H04L 5/0064* (2013.01); *H04W 72/0453* (2013.01); *H04W 72/0493* (2013.01)

(56) References Cited

U.S. PATENT DOCUMENTS

| | | | |
|---|---|---|---|
| 2014/0348103 A1* | 11/2014 | Kim | H04L 5/0053 |
| | | | 370/329 |
| 2017/0041923 A1 | 2/2017 | Park | |
| 2017/0055240 A1 | 2/2017 | Kim et al. | |
| 2017/0318565 A1 | 11/2017 | Golitschek Edler von Elbwart et al. | |
| 2019/0261407 A1* | 8/2019 | Irukulapati | H04W 74/008 |
| 2020/0021406 A1* | 1/2020 | Al-Imari | H04L 5/0007 |
| 2020/0059866 A1* | 2/2020 | Takeda | H04W 16/28 |

OTHER PUBLICATIONS

China National Intellectual Property Administration, International Search Report and Written Opinion for PCT/CN2019/096089, dated Oct. 16, 2019.

Intel Corporation, Further considerations on DCI formats, 3GPP TSG-RAN WG1 Meeting #93, R1-1806517, Busan, South Korea, May 21-25, 2018.

Ericsson, Remaining issues of UL/DL Resource Allocation, 3GPP TSG-RAN WG1 Meeting #93, R1-1807412, Busan, South Korea, May 21-25, 2018.

* cited by examiner

METHOD AND APPARATUS FOR FREQUENCY DOMAIN RESOURCE ALLOCATION WHEN FREQUENCY HOPPING IS ENABLED IN MOBILE COMMUNICATIONS

CROSS REFERENCE TO RELATED PATENT APPLICATION(S)

The present disclosure is part of a non-provisional application claiming the priority benefit of U.S. Patent Application No. 62/698,390, filed on 16 Jul. 2018, the content of which is incorporated by reference in its entirety.

TECHNICAL FIELD

The present disclosure is generally related to mobile communications and, more particularly, to frequency domain-resource allocation (FD-RA) when frequency hopping is enabled with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

The concept of bandwidth part (BWP) is also introduced to achieve better frequency spectrum efficiency and reduce user equipment (UE) power consumption. Carrier BWP is a contiguous set of physical resource blocks selected from a contiguous subset of the common resource blocks for a given numerology on a given carrier. Currently, the maximum size of the uplink BWP's bandwidth is 275 RBs. Thus, 16 bits RIV are enough to cover all possible combinations of starting RBs and RB lengths.

However, when frequency hopping is enabled for uplink FD-RA, it will borrow 1 or 2 bits from the frequency domain RA bit-field to indicate the hopping position. Then, only 14 bits can be used to represent the frequency allocation. Such issue will limit the size and the position of the resource allocation when frequency hopping is enabled. This will not be ideal for URLLC which requires in general large frequency allocation and more flexibility to meet the reliability and the latency requirements.

Accordingly, how to configure FD-RA when frequency hopping is enabled may become an important issue in the newly developed wireless communication network. Therefore, it is needed to provide proper schemes to determine FD-RA and avoid inefficient spectrum usage.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to FD-RA when frequency hopping is enabled with respect to user equipment and network apparatus in mobile communications.

In one aspect, a method may involve an apparatus determining whether frequency hopping is enabled. The method may also involve the apparatus determining at least one of a first coarse step size corresponding to a start of an FD-RA and a second coarse step size corresponding to a length of the FD-RA in an event that the frequency hopping is enabled. The method may further involve the apparatus determining allocated resources blocks (RBs) according to at least one of the first coarse step size and the second coarse step size. The method may further involve the apparatus performing, by the processor, a transmission on the allocated RBs.

In one aspect, an apparatus may comprise a transceiver capable of wirelessly communicating with a network node of a wireless network. The apparatus may also comprise a processor communicatively coupled to the transceiver. The processor may be capable of determining whether frequency hopping is enabled. The processor may also be capable of determining at least one of a first coarse step size corresponding to a start of an FD-RA and a second coarse step size corresponding to a length of the FD-RA in an event that the frequency hopping is enabled. The processor may further be capable of determining allocated RBs according to at least one of the first coarse step size and the second coarse step size. The processor may further be capable of performing a transmission on the allocated RBs.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
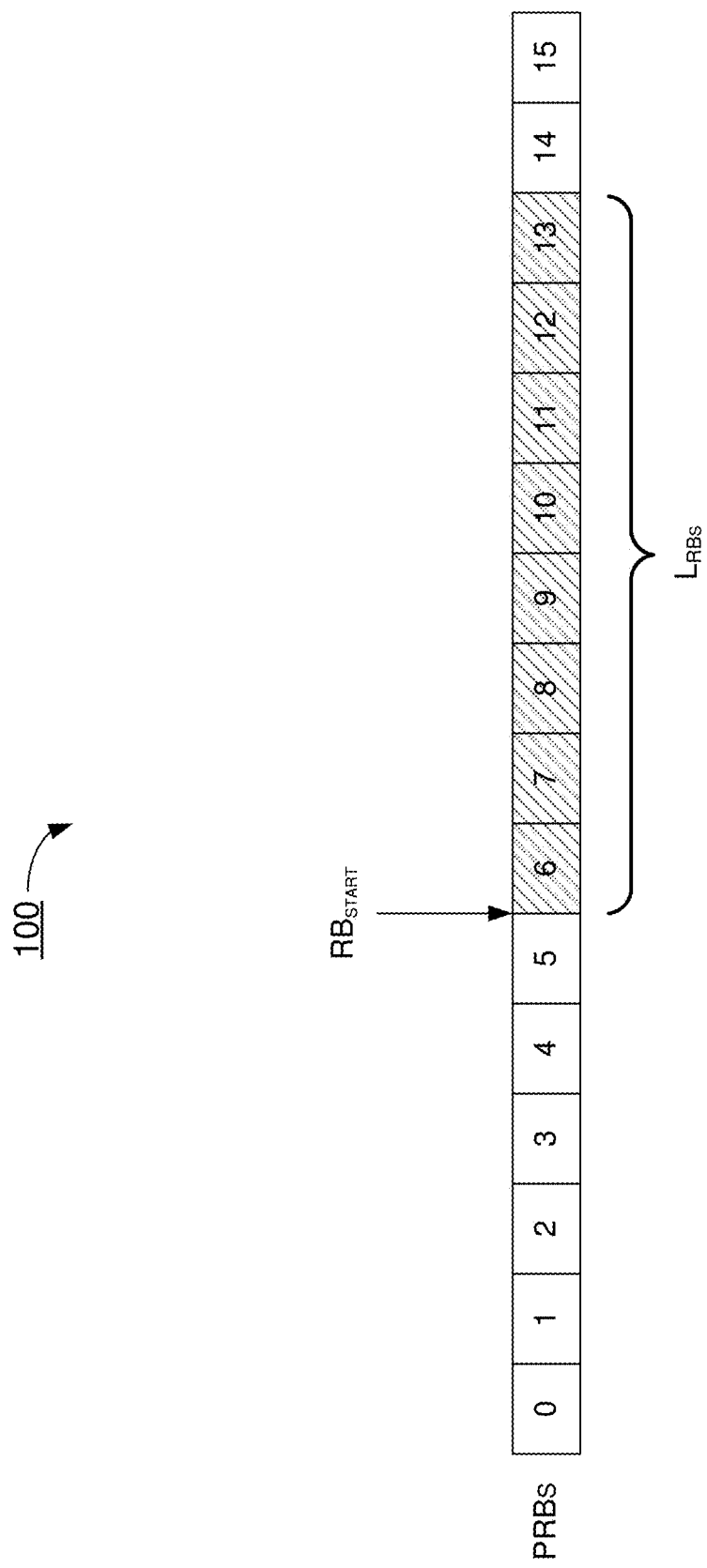
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to FD-RA when frequency hopping is enabled with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

The UE shall determine the resource block assignment in frequency domain using the resource allocation field in the detected physical downlink control channel (PDCCH) DCI. In NR, two resource allocation schemes, type 0 and type 1, are supported. In resource allocation of type 1, the resource block assignment information may be indicated to a scheduled UE a set of contiguously allocated localized or distributed virtual resource blocks within the active carrier bandwidth part of size $N_{BWP}^{size}$ physical resource blocks (PRBs). The type 1 resource allocation field may consist of a resource indication value (RIV) corresponding to a starting virtual resource block (e.g., $RB_{start}$) and a length in terms of contiguously allocated resource blocks (e.g., $L_{RBs}$). The RIV may be defined by the following expressions.

If $(L_{RBs} - 1) \le \lfloor N_{BWP}^{size}/2 \rfloor$ then
    $RIV = N_{BWP}^{size} (L_{RBs} - 1) + RB_{start}$
else
    $RIV = N_{BWP}^{size} (N_{BWP}^{size} - L_{RBs} + 1) + (N_{BWP}^{size} - 1 - RB_{start})$ where $L_{RBs} \ge 1$ and shall not exceed $N_{BWP}^{size} - RB_{start}$.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). In scenario 100, assuming that $N_{BWP}^{size}=56$, $L_{RBs}=8$, and $RB_{start}=6$, the value of RIV may be determined by the equation of $RIV=N_{BWP}^{size}(L_{RBs}-1)+RB_{start}=56(8-1)+6=398$.

In NR, the concept of bandwidth part (BWP) is introduced to achieve better frequency spectrum efficiency and reduce UE power consumption. Carrier BWP is a contiguous set of physical resource blocks selected from a contiguous subset of the common resource blocks for a given numerology on a given carrier. Currently, the maximum size of the uplink BWP's bandwidth is 275 RBs. Thus, 16 bits RIV are enough to cover all possible combinations of starting RBs and RB lengths according to the equation of $\lceil \log_2(275*(275+1)/2) \rceil = 16$ bits.

Figure 2:
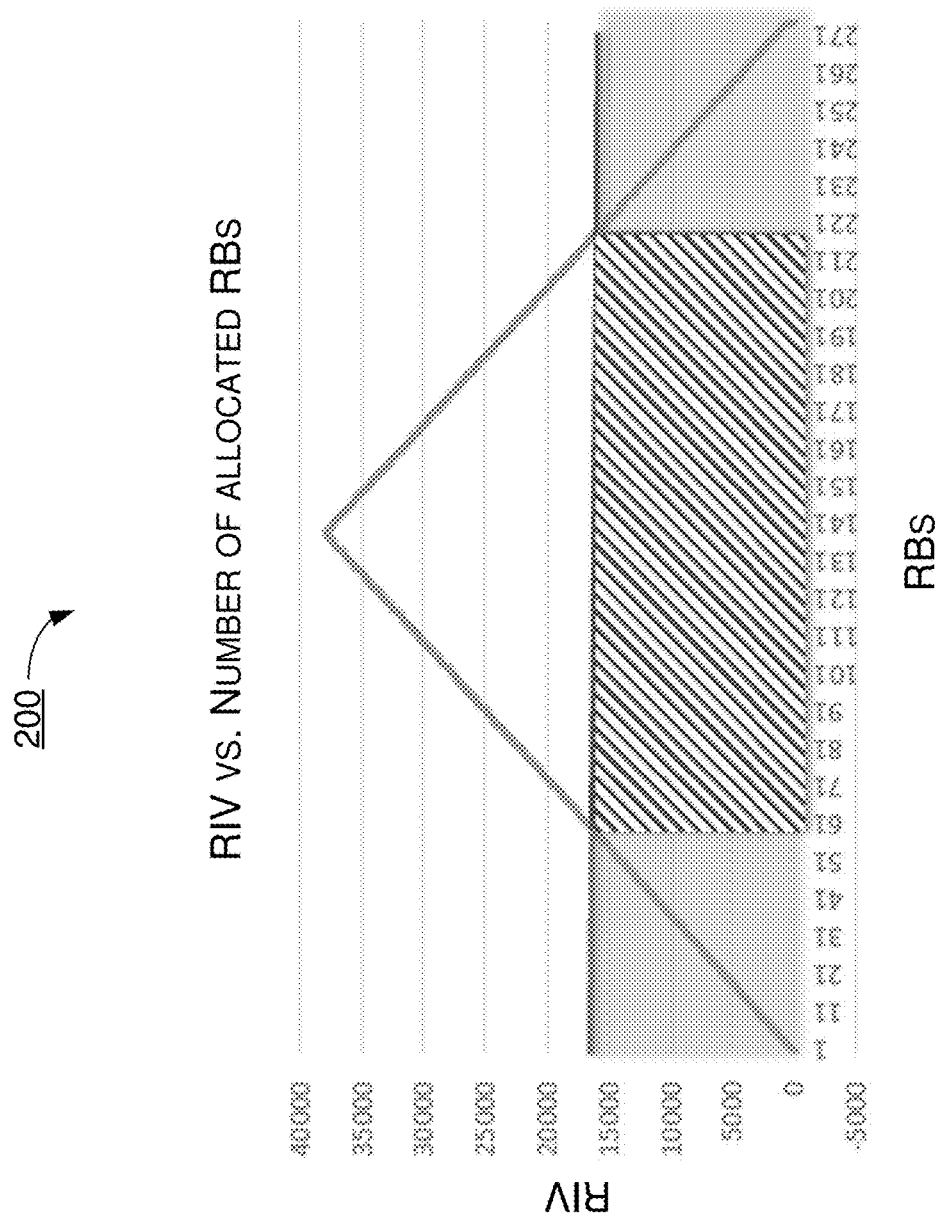
FIG. 2 is a diagram depicting an example scenario under schemes in accordance with implementations of the present disclosure.

However, when frequency hopping is enabled for uplink FD-RA, it will borrow 1 or 2 bits from the frequency domain RA bit-field to indicate the hopping position. 2 or 4 hopping positions are RRC configured to the UE and the selection of the hopping position is done dynamically through the DCI by taking 1 or 2 bits from the FD-RA bit-field. Then, only 14 bits can be used to represent the frequency allocation. The maximum RIV using 14 bits is 0x3FFF which is equal to 16383. Therefore, when using 14 bits for RIV value and BWP's bandwidth is 275, only [1,60] and [218, 275] resource blocks can be used for allocation size. FIG. 2 illustrates an example scenario 200 under schemes in accordance with implementations of the present disclosure. Scenario 200 illustrates PRBs allocation when 14 bits are used for the RIV value. As shown in FIG. 2, resource blocks 61-217 are not able to be indicated by the 14 bits RIV. BWP's bandwidth with size greater than 60 RBs and less than 218 RBs is not possible to be allocated.

Such issue will limit the size and the position of the resource allocation when frequency hopping is enabled. This will not be ideal for URLLC which requires in general large frequency allocation and more flexibility to meet the reliability and the latency requirements.

In view of the above, the present disclosure proposes a number of schemes pertaining to FD-RA when frequency hopping is enabled with respect to the UE and the network apparatus. According to the schemes of the present disclosure, coarse step sizes may be used for the RB length and start when the frequency hopping is used. A first coarse step size may be used for the RB start. A second coarse step size may be used for the RB length. The coarse step sizes may be designed to fulfil certain conditions to avoid holes in the spectrum and inefficient spectrum usage. Therefore, even when the number of bits for the RIV value are reduced, most resource allocation combinations can still be indicated/allocated according to the schemes in the present disclosure.

Specifically, the UE may be configured to determine whether frequency hopping is enabled. The UE may be configured to determine at least one of a first coarse step size corresponding to a start of an FD-RA and a second coarse step size corresponding to a length of the FD-RA in an event that the frequency hopping is enabled. For example, the first coarse step size (e.g., $S_s$) may be used to determine the RB start. The second coarse step size (e.g., $S_L$) may be used to determine the RB length. Then, the UE may be configured to determine allocated RBs according to at least one of the first coarse step size and the second coarse step size. The UE may perform a transmission on the allocated RBs. The transmission may comprise an uplink transmission or a downlink transmission. At least one of the first coarse step size and the second coarse step size may be greater than one.

The first coarse step size and the second coarse step size may be designed to fulfil a condition to avoid holes in spectrums. For example, the first coarse step size and the second coarse step size may be designed to satisfy the following equation.

$$S_L = m \cdot S_S \text{ where } m \in \{1,2,3,4 \ldots\}$$

Specifically, the second coarse step size (e.g., $S_L$) equals to the first coarse step size (e.g., $S_s$) multiplied by a variable m. The variable m may be a positive integer.

In some implementations, step sizes may depend on the number of bits allocated for frequency hopping. The UE may be configured to determine at least one of the first coarse step size and the second coarse step size according to a number of bits used by the frequency hopping. Specifically, smaller step sizes may be used for 1 bit DCI frequency hopping, and coarser step sizes may be used for 2 bits DCI frequency hopping. Since more bits are used/borrowed by the frequency hopping indication, less bits are reserved in RIV for indicating FD-RA. Coarser/greater step sizes may be used to avoid holes in the spectrum.

In some implementations, the scheme of coarse allocation step size for FD-RA may be enabled/configured via a dedicated signal. For example, a radio resource control (RRC) parameter may be used to enable/configure the coarse allocation step size. Alternatively, the scheme of coarse allocation step size for FD-RA may be applicable for specific DCI formats only (e.g. compact DCI). Alternatively, the concept of coarse allocation step size for FD-RA may be applicable for specific radio network temporary identifiers (RNTIs) only (e.g. MCS-RNTI). The UE may be configured to enable at least one of the first coarse step size and the second coarse step size in response to at least one of an RRC configuration, a specific DCI format, and a specific RNTI.

In some implementations, when the number of bits used for uplink frequency domain resource allocation when frequency hopping is enabled (e.g., $N_{UL\_hp}$) comprises 1 bit and $N_{BWP}^{size} < 50$ RBs, $S_s = 1$ and $S_L = 2$ are sufficient for FD-RA. When $S_s = 1$ and $S_L = 2$, the total resource allocation combinations may comprise 9 combinations. The required bits for FD-RA may need 4 bits. The available bits for FD-RA may comprise 3 bits according to ceil(log 2(5*(5+1)/2))−1. Thus, the missing resource allocation combinations may comprise only 1 combination according to 9−2³=1.

In some implementations, when the number of bits used for uplink frequency domain resource allocation when frequency hopping is enabled (e.g., $N_{UL\_hp}$) comprises 2 bit and $N_{BWP}^{size} \geq 50$ RBs, $S_s = 2$ and $S_L = 2$ are sufficient for FD-RA. When $S_s = 2$ and $S_L = 2$, the total resource allocation combinations may comprise 1035 combinations. The required bits for FD-RA may need 11 bits. The available bits for FD-RA may comprise 10 bits according to ceil(log₂(90*(90+1)/2))−2. Thus, the missing resource allocation combinations may comprise only 11 combination according to 1035−2¹⁰=11.

In some implementations, the step sizes (e.g., $S_L$ and $S_S$) may be determined based on the number of bits used for the frequency hopping. For example, $S_s = 1$ and $S_L = 2$ for $N_{UL\_hp} = 1$, and $S_s = S_L = 2$ for $N_{UL\_hp} = 2$. Alternatively, $S_s = 2$ and $S_L = 1$ for $N_{UL\_hp} = 1$, and $S_s = S_L = 2$ for $N_{UL\_hp} = 2$. For $S_s = 1$ and $S_L = 2$, the following procedures may be used to determine the RIV.

$\overline{N} = \lfloor N_{BWP}^{size}/S_L \rfloor S_L$, $RB_{start} = 0, \ldots, N_{BWP}^{size} - 1$
{or $\overline{N} = \lfloor N_{BWP}^{size}/S_L \rfloor S_L$ and $RB_{start} = 0, \ldots, \overline{N} - 1$ }
$L_{RBs}' = L_{RBs}/S_L$, with $L_{RBs} = S_L, 2S_L, \ldots, \overline{N}$ If $L_{RBs}' \leq \lceil \overline{N}/(2S_L) \rceil$ then
$\quad RIV = \overline{N}(L_{RBs}' - 1) + RB_{start}$
else
$\quad RIV = \overline{N}(\overline{N}/S_L - L_{RBs}') + (\overline{N} - 1 - RB_{start})$ For $S_s = 2$ and $S_L = 1$, the following procedures may be used to determine the RIV.

$\overline{N} = \lfloor N_{BWP}^{size}/S_S \rfloor S_S$, $RB_{start}' = RB_{start}/S_S$ with $RB_{start} = 0, S_S, 2S_S, \ldots, \overline{N}$
If $(L_{RBs} - 1) \leq \lfloor \overline{N}/2 \rfloor$ then
$\quad RIV = \overline{N}/S_S(L_{RBs} - 1) + RB_{start}'$
else
$\quad RIV = \overline{N}((\overline{N} - L_{RBs})/S_S + 1) + (\overline{N}/S_S - 1 - RB_{start}')$ For $S_s = 2$ and $S_L = 2$, the following procedures may be used to determine the RIV.

$\overline{N} = \lfloor N_{BWP}^{size}/2 \rfloor$
If $(L_{RBs}' - 1) \leq \lfloor \overline{N}/2 \rfloor$ then
$\quad RIV = \overline{N}(L_{RBs}' - 1) + RB_{start}'$
else
$\quad RIV = \overline{N}(\overline{N} - L_{RBs}' + 1) + (\overline{N} - 1 - RB_{start}')$ where $L_{RBs}' = L_{RBs}/2$, $RB_{start}' = RB_{start}/2$.

In some implementations, the UE may be configured to receive the RIV from the network node. The UE may be configured to determine the start of the FD-RA and the length of the FD-RA according to the RIV. Then, the UE may determine the allocated RBs based on the start of the FD-RA and the length of the FD-RA. The RIV may be determined according to at least one of the first coarse step size and the second coarse step size.

Illustrative Implementations

Figure 3:
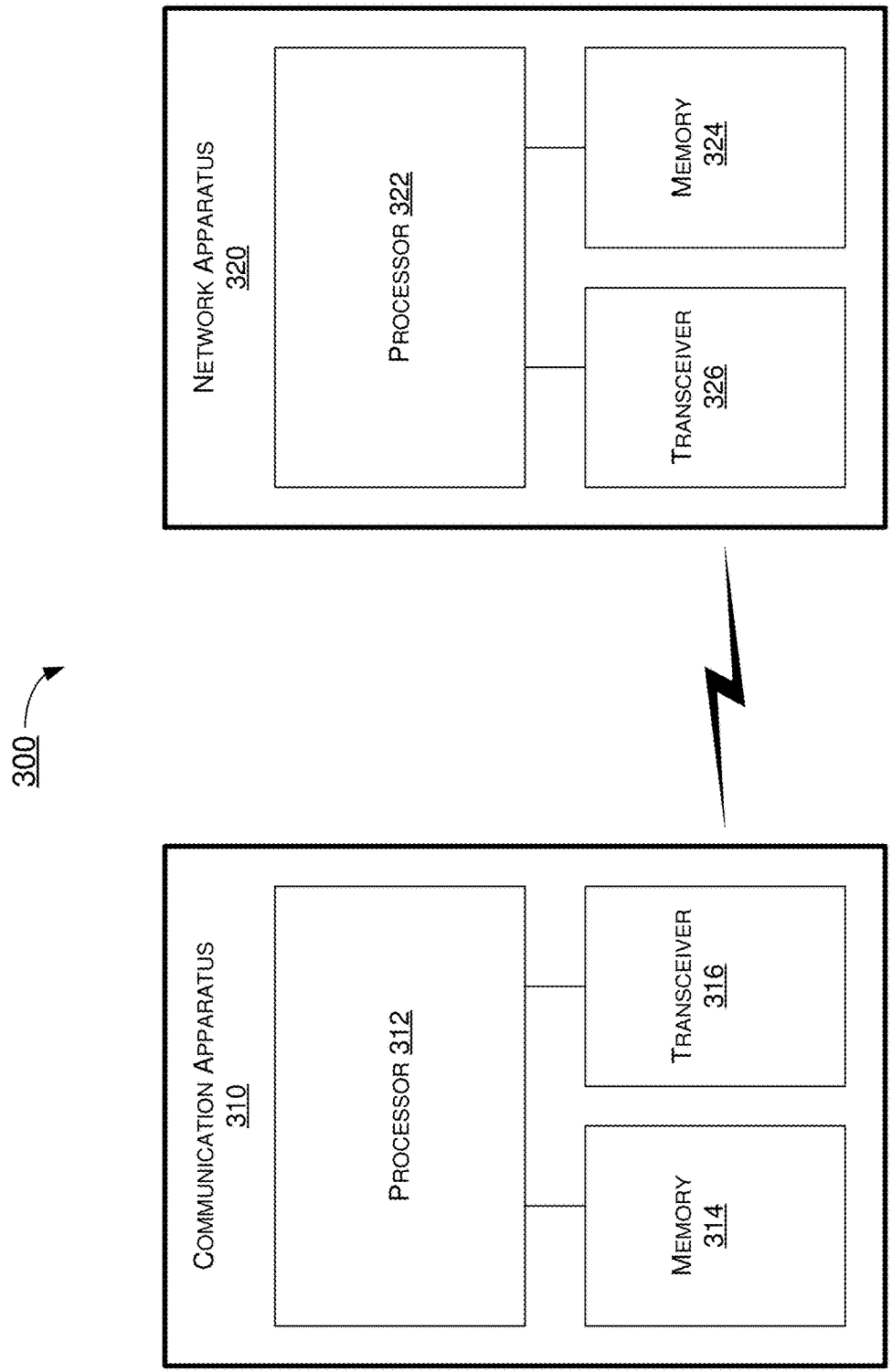
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to FD-RA when frequency hopping is enabled with respect to user equipment and network apparatus in wireless communications, including schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complexinstruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more RISC or CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to determine whether frequency hopping is enabled. Processor 312 may be configured to determine at least one of a first coarse step size corresponding to a start of an FD-RA and a second coarse step size corresponding to a length of the FD-RA in an event that the frequency hopping is enabled. For example, the first coarse step size (e.g., $S_s$) may be used to determine the RB start. The second coarse step size (e.g., $S_L$) may be used to determine the RB length. Then, processor 312 may be configured to determine allocated RBs according to at least one of the first coarse step size and the second coarse step size. Processor 312 may perform, via transceiver 316, a transmission on the allocated RBs. The transmission may comprise an uplink transmission or a downlink transmission. At least one of the first coarse step size and the second coarse step size may be greater than one.

In some implementations, step sizes may depend on the number of bits allocated for frequency hopping. Processor 312 and/or 322 may be configured to determine at least one of the first coarse step size and the second coarse step size according to a number of bits used by the frequency hopping. Specifically, processor 312 and/or 322 may use smaller step sizes for 1 bit DCI frequency hopping, and use coarser step sizes for 2 bits DCI frequency hopping. Since more bits are used/borrowed by the frequency hopping indication, less bits are reserved in RIV for indicating FD-RA. Processor 312 and/or 322 may use coarser/greater step sizes to avoid holes in the spectrum.

In some implementations, the scheme of coarse allocation step size for FD-RA may be enabled/configured via a dedicated signal. For example, processor 322 may use an RRC parameter to enable/configure the coarse allocation step size. Alternatively, processor 322 may use specific DCI formats (e.g. compact DCI) to enable/configure the coarse allocation step size for FD-RA. Alternatively, processor 322 may use specific RNTI (e.g. MCS-RNTI) to enable/configure the coarse allocation step size for FD-RA. Processor 312 may be configured to enable at least one of the first coarse step size and the second coarse step size in response to at least one of an RRC configuration, a specific DCI format, and a specific RNTI.

In some implementations, when the number of bits used for uplink frequency domain resource allocation when frequency hopping is enabled (e.g., $N_{UL\_hp}$) comprises 1 bit and $N_{BWP}^{size}<50$ RBs, processor 312 and/or 322 may use $S_s=1$ and $S_L=2$ for FD-RA. When $S_s=1$ and $S_L=2$, processor 312 and/or 322 may have 9 combinations for the total resource allocation combinations. Processor 312 and/or 322 may need 4 bits for the required bits for FD-RA. Processor 312 and/or 322 may use 3 bits for the available bits for FD-RA according to ceil(log 2(5*(5+1)/2))−1.

In some implementations, when the number of bits used for uplink frequency domain resource allocation when frequency hopping is enabled (e.g., $N_{UL\_hp}$) comprises 2 bit and $N_{BWP}^{size} \geq 50$ RBs, processor 312 and/or 322 may use $S_s=2$ and $S_L=2$ for FD-RA. When $S_s=2$ and $S_L=2$, processor 312 and/or 322 may have 1035 combinations for the total resource allocation combinations. Processor 312 and/or 322 may need 11 bits for the required bits for FD-RA. Processor 312 and/or 322 may use 10 bits for the available bits for FD-RA according to ceil(log 2(90*(90+1)/2))–2.

In some implementations, processor 312 and/or 322 may determine the step sizes (e.g., $S_L$ and $S_s$) based on the number of bits used for the frequency hopping. For example, processor 312 and/or 322 may determine $S_s$=1 and $S_L$=2 for $N_{UL\_hp}$=1, and $S_s$=$S_L$=2 for $N_{UL\_hp}$=2. Alternatively, processor 312 and/or 322 may determine $S_s$=2 and $S_L$=1 for $N_{UL\_hp}$=1, and $S_s$=$S_L$=2 for $N_{UL\_hp}$=2. For $S_s$=1 and $S_L$=2, processor 312 and/or 322 may be configured to determine the RIV according to the following procedures.

$$\overline{N} = \lceil N_{BWP}^{size}/S_L \rceil S_L, RB_{start} = 0,...,N_{BWP}^{size}-1$$
$$\{or\ \overline{N} = \lfloor N_{BWP}^{size}/S_L \rfloor S_L\ and\ RB_{start} = 0,...,\overline{N}-1\}$$
$$L_{RBs}' = L_{RBs}/S_L,\ with\ L_{RBs} = S_L, 2S_L, ..., \overline{N}$$
$$If\ L_{RBs}' \le \lceil \overline{N}/(2S_L) \rceil\ then$$
$$\quad RIV = \overline{N}(L_{RBs}' - 1) + RB_{start}$$
$$else$$
$$\quad RIV = \overline{N}(\overline{N}/S_L - L_{RBs}') + (\overline{N} - 1 - RB_{start})$$

For $S_s$=2 and $S_L$=1, processor 312 and/or 322 may be configured to determine the RIV according to the following procedures.

$$\overline{N} = \lfloor N_{BWP}^{size}/S_S \rfloor S_S,\ RB_{start}' = RB_{start}/S_s\ with\ RB_{start} = 0, S_s, 2S_s, ..., \overline{N}$$
$$If\ (L_{RBs} - 1) \le \lfloor \overline{N}/2 \rfloor\ then$$
$$\quad RIV = \overline{N}/S_S(L_{RBs} - 1) + RB_{start}'$$
$$else$$
$$\quad RIV = \overline{N}((\overline{N} - L_{RBs})/S_S + 1) + (\overline{N}/S_S - 1 - RB_{start}')$$

For $S_s$=2 and $S_L$=2, processor 312 and/or 322 may be configured to determine the RIV according to the following procedures.

$$\overline{N} = \lfloor N_{BWP}^{size}/2 \rfloor$$
$$If\ (L_{RBs}' - 1) \le \lfloor \overline{N}/2 \rfloor\ then$$
$$\quad RIV = \overline{N}(L_{RBs}' - 1) + RB_{start}'$$
$$else$$
$$\quad RIV = \overline{N}(\overline{N} - L_{RBs}' + 1) + (\overline{N} - 1 - RB_{start}')$$

where $L_{RBs}'$=$L_{RBs}/2$, $RB_{start}'$=$RB_{start}/2$.

In some implementations, processor 312 may be configured to receive, via transceiver 316, the RIV from network apparatus 320. Processor 312 may be configured to determine the start of the FD-RA and the length of the FD-RA according to the RIV. Then, processor 312 may determine the allocated RBs based on the start of the FD-RA and the length of the FD-RA. The RIV may be determined according to at least one of the first coarse step size and the second coarse step size.

Illustrative Processes

Figure 4:
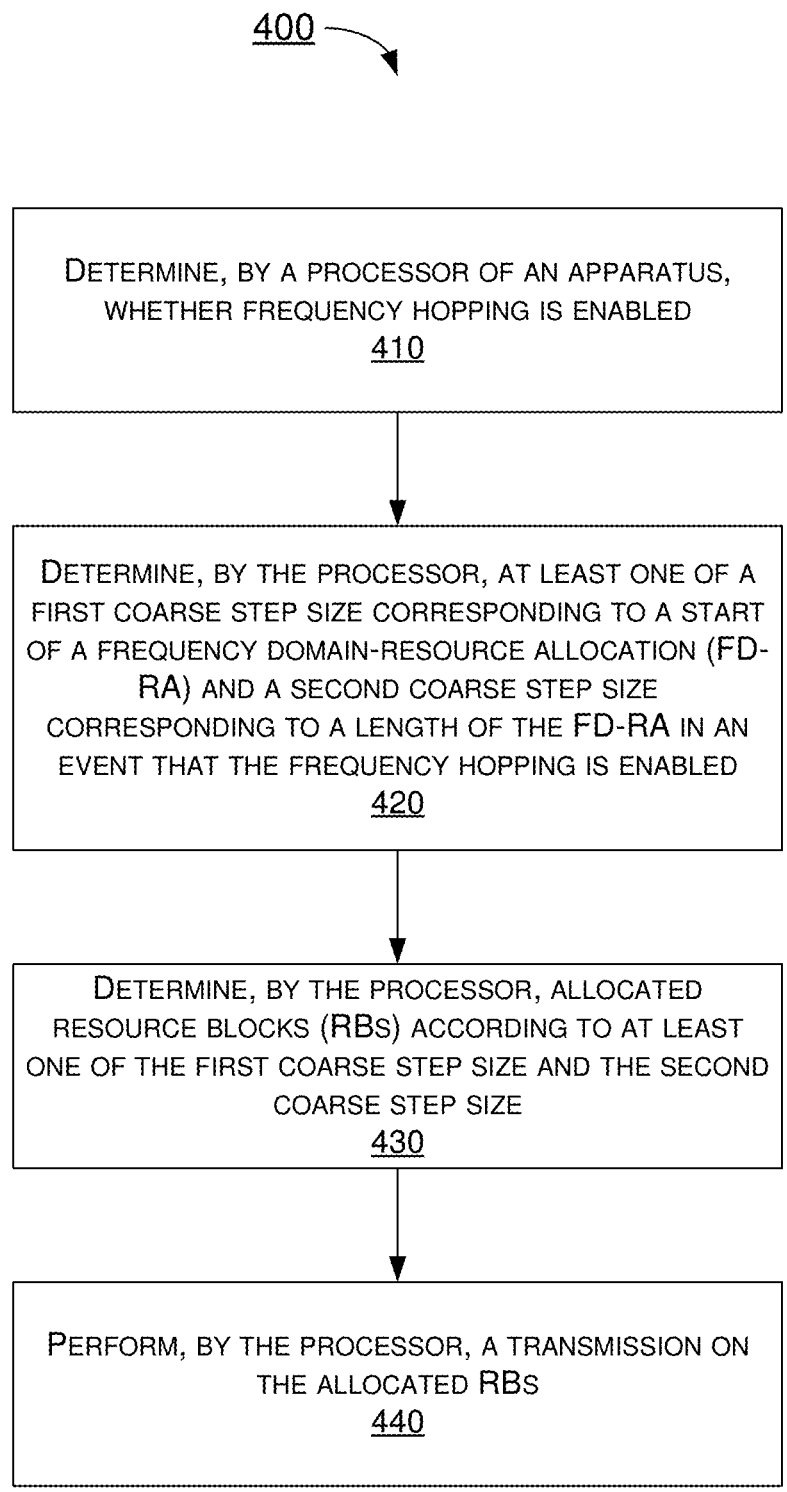
FIG. 4 is a flowchart of an example process in accordance with an implementation of the present disclosure.

FIG. 4 illustrates an example process 400 in accordance with an implementation of the present disclosure. Process 400 may be an example implementation of above scenarios, whether partially or completely, with respect to FD-RA when frequency hopping is enabled with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 determining whether frequency hopping is enabled. Process 400 may proceed from 410 to 420.

At 420, process 400 may involve processor 312 determining at least one of a first coarse step size corresponding to a start of an FD-RA and a second coarse step size corresponding to a length of the FD-RA in an event that the frequency hopping is enabled. Process 400 may proceed from 420 to 430.

At 430, process 400 may involve processor 312 determining allocated RBs according to at least one of the first coarse step size and the second coarse step size. Process 400 may proceed from 430 to 440.

At 440, process 400 may involve processor 312 performing a transmission on the allocated RBs.

In some implementations, at least one of the first coarse step size and the second coarse step size is greater than one.

In some implementations, the first coarse step size and the second coarse step size may fulfil a condition to avoid holes in spectrums.

In some implementations, the second coarse step size may equal to the first coarse step size multiplied by a positive integer.

In some implementations, process 400 may involve processor 312 determining at least one of the first coarse step size and the second coarse step size according to a number of bits used by the frequency hopping.

In some implementations, process 400 may involve processor 312 enabling at least one of the first coarse step size and the second coarse step size in response to at least one of an RRC configuration, a specific DCI format, and a specific RNTI.

In some implementations, process 400 may involve processor 312 receiving an RIV. Process 400 may further involve processor 312 determining the start of the FD-RA and the length of the FD-RA according to the RIV. The RIV may comprise at least one bit used to indicate the frequency hopping.

In some implementations, the RIV may be determined according to at least one of the first coarse step size and the second coarse step size.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether frequency hopping is enabled;
   determining, by the processor, at least one of a first coarse step size corresponding to a start of a frequency domain-resource allocation (FD-RA) and a second coarse step size corresponding to a length of the FD-RA in an event that the frequency hopping is enabled;
   determining, by the processor, allocated resources blocks (RBs) according to at least one of the first coarse step size and the second coarse step size; and
   performing, by the processor, a transmission on the allocated RBs.

2. The method of claim 1, wherein at least one of the first coarse step size and the second coarse step size is greater than one.

3. The method of claim 1, wherein the first coarse step size and the second coarse step size fulfil a condition to avoid holes in spectrums.

4. The method of claim 1, wherein the second coarse step size equals to the first coarse step size multiplied by a positive integer.

5. The method of claim 1, wherein the determining of at least one of the first coarse step size and the second coarse step size comprises determining at least one of the first coarse step size and the second coarse step size according to a number of bits used by the frequency hopping.

6. The method of claim 1, further comprising:
   receiving, by the processor, a resource indication value (RIV); and
   determining, by the processor, the start of the FD-RA and the length of the FD-RA according to the RIV,
   wherein the RIV comprises at least one bit used to indicate the frequency hopping.

7. The method of claim 6, wherein the RIV is determined according to at least one of the first coarse step size and the second coarse step size.

8. A method of claim 1, comprising:
   enabling, by a processor of an apparatus, at least one of a first coarse step size corresponding to a start of a frequency domain-resource allocation (FD-RA) and a second coarse step size corresponding to a length of the FD-RA in response to at least one of a radio resource control (RRC) configuration, a specific downlink control information (DCI) format, and a specific radio network temporary identifier (RNTI);
   determining, by the processor, allocated resource blocks (RBs) according to at least one of the first course step size and the second course step size; and
   performing, by the processor, a transmission on the allocated RBs.

9. The apparatus of claim 8, wherein the first coarse step size and the second coarse step size are identical.

10. An apparatus, comprising:
    a transceiver which, during operation, wirelessly communicates with a network node of a wireless network; and
    a processor communicatively coupled to the transceiver such that, during operation, the processor performs operations comprising:
       determining whether frequency hopping is enabled;
       determining at least one of a first coarse step size corresponding to a start of a frequency domain-resource allocation (FD-RA) and a second coarse step size corresponding to a length of the FD-RA in an event that the frequency hopping is enabled;

determining allocated resources blocks (RBs) according to at least one of the first coarse step size and the second coarse step size; and performing, via the transceiver, a transmission on the allocated RBs.

11. The apparatus of claim 10, wherein at least one of the first coarse step size and the second coarse step size is greater than one.

12. The apparatus of claim 10, wherein the first coarse step size and the second coarse step size fulfil a condition to avoid holes in spectrums.

13. The apparatus of claim 10, wherein the second coarse step size equals to the first coarse step size multiplied by a positive integer.

14. The apparatus of claim 10, wherein, in determining at least one of the first coarse step size and the second coarse step size, the processor determines at least one of the first coarse step size and the second coarse step size according to a number of bits used by the frequency hopping.

15. The apparatus of claim 10, wherein, during operation, the processor further performs operations comprising:

receiving, via the transceiver, a resource indication value (RIV); and determining the start of the FD-RA and the length of the FD-RA according to the RIV, wherein the RIV comprises at least one bit used to indicate the frequency hopping.

16. The apparatus of claim 15, wherein the RIV is determined according to at least one of the first coarse step size and the second coarse step size.

17. An apparatus, comprising:

a transceiver which, during operation, wirelessly communicates with a network node of a wireless network; and a processor communicatively coupled to the transceiver such that, during operation, the processor performs operations comprising:

enabling at least one of a first coarse step size corresponding to a start of a frequency domain-resource allocation (FD-RA) and a second coarse step size corresponding to a length of the FD-RA in response to at least one of a radio resource control (RRC) configuration, a specific downlink control information (DCI) format, and a specific radio network temporary identifier (RNTI);

determining allocated resource blocks (RBs) according to at least one of the first coarse step size and the second coarse step size; and performing, via the transceiver, a transmission on the allocated RBs.

18. The apparatus of claim 17, wherein the first coarse step size and the second coarse step size are identical.

* * * * *